US012686543B2

(12) United States Patent
Niles et al.

(10) Patent No.: US 12,686,543 B2
(45) Date of Patent: Jul. 21, 2026

(54) STARCH-BASED PACKAGING MATERIAL, APPARATUS AND METHOD FOR MAKING SAME

(71) Applicant: NewStarch Solutions, LLC, Plymouth, MN (US)

(72) Inventors: Matthew H. Niles, Otsego, MN (US); L. Ronald Bartels, Bay City, WI (US)

(73) Assignee: New Starch Solutions, LLC, Plymouth, MN (US)

( * ) Notice: Subject to any disclaimer, the term of this patent is extended or adjusted under 35 U.S.C. 154(b) by 0 days.

(21) Appl. No.: 17/734,308

(22) Filed: May 2, 2022

(65) Prior Publication Data

US 2023/0348161 A1 Nov. 2, 2023

(51) Int. Cl.
B65D 65/40 (2006.01)
B29C 48/00 (2019.01)
(Continued)

(52) U.S. Cl.
CPC .......... B65D 65/40 (2013.01); B29C 48/0011 (2019.02); B29C 48/0022 (2019.02); B29C 48/08 (2019.02); B29C 48/32 (2019.02); B32B 3/28 (2013.01); B32B 5/18 (2013.01); B32B 29/007 (2013.01); B32B 37/156 (2013.01); B29K 2003/00 (2013.01); B29L 2007/002 (2013.01); B32B 2250/42 (2013.01);
(Continued)

(58) Field of Classification Search
CPC ........... B32B 3/28; B32B 5/18; B32B 29/007; B32B 2307/72; B32B 2317/20; B32B 2553/00; B32B 9/046; B32B 9/06; B32B 29/08; B32B 29/005; B32B 2250/42; B32B 2266/02; B32B 2317/18; B32B 2317/127; B65D 65/40
See application file for complete search history.

(56) References Cited

U.S. PATENT DOCUMENTS

| | | | |
|---|---|---|---|
| 1,013,458 A | 1/1912 | Smith et al. | |
| 4,571,360 A * | 2/1986 | Brown ................... | D21H 17/00 521/85 |

(Continued)

FOREIGN PATENT DOCUMENTS

| | | | | |
|---|---|---|---|---|
| AU | 2019-455809 A1 | 3/2021 | | |
| JP | 2020-094189 A | 6/2020 | | |
| WO | WO-2020230035 A1 * | 11/2020 | ........... | C09D 103/02 |

*Primary Examiner* — Catherine A. Simone
(74) *Attorney, Agent, or Firm* — Christensen, Fonder, Dardi & Busse PLLC; Peter S. Dardi; Elizabeth A. Gallo

(57) ABSTRACT

Starch-based packaging material and methods for making the material are described. The starch-based packaging material can comprise layers of expanded starch with a cellulosic web disposed between the layers. The expanded starch can be formed by extruding starch with water which acts as an expanding agent and causes the starch to expand resulting in an extrudate having a density of no more than about 5 lbs/ft$^3$. An apparatus and methods for post-processing the expanded starch are described wherein the expanded starch is extruded as a tube that enters a funnel and is advanced forward by forced air. The tube passes over a blade where the tube is slit and subsequently opened up into a sheet by a second supply of forced air. The sheet then exits the funnel and can be calendered as well as stacked with subsequent lamination.

24 Claims, 11 Drawing Sheets

(51) Int. Cl.

| | |
|---|---|
| *B29C 48/08* | (2019.01) |
| *B29C 48/32* | (2019.01) |
| *B32B 3/28* | (2006.01) |
| *B32B 5/18* | (2006.01) |
| *B32B 29/00* | (2006.01) |
| *B32B 37/00* | (2006.01) |
| *B29L 7/00* | (2006.01) |

(52) U.S. Cl.

CPC ....... *B32B 2266/02* (2013.01); *B32B 2307/72* (2013.01); *B32B 2317/12* (2013.01); *B32B 2317/20* (2013.01); *B32B 2553/00* (2013.01)

(56) References Cited

U.S. PATENT DOCUMENTS

| | | | |
|---|---|---|---|
| 4,673,438 A | | 6/1987 | Wittwer et al. |
| 5,095,054 A | | 3/1992 | Lay et al. |
| 5,288,219 A | | 2/1994 | Smith |
| 5,308,879 A | | 5/1994 | Akamatu et al. |
| 5,413,855 A | | 5/1995 | Kolaska et al. |
| 5,589,518 A | | 12/1996 | Bastioli et al. |
| 5,736,586 A | | 4/1998 | Bastioli et al. |
| 5,766,529 A | * | 6/1998 | Franke ..................... B29B 7/88 |
| | | | 264/143 |
| 5,766,749 A | | 6/1998 | Kakinoki et al. |
| 5,958,185 A | * | 9/1999 | Vinson .................. D21H 17/68 |
| | | | 162/149 |
| 6,183,814 B1 | * | 2/2001 | Nangeroni ........... C09D 167/04 |
| | | | 427/361 |
| 7,981,338 B2 | | 7/2011 | Franke et al. |
| 10,920,043 B2 | | 2/2021 | Niles |
| 2002/0068139 A1 | * | 6/2002 | Polak ................. B65D 81/3823 |
| | | | 428/167 |
| 2005/0069679 A1 | | 3/2005 | Stelljes, Jr. et al. |
| 2007/0004827 A1 | | 1/2007 | Franke et al. |
| 2007/0021515 A1 | | 1/2007 | Glenn et al. |
| 2007/0264442 A1 | * | 11/2007 | Chang ................... D21H 19/70 |
| | | | 427/538 |
| 2008/0300120 A1 | | 12/2008 | Sato |
| 2009/0324913 A1 | | 12/2009 | Bastioli et al. |
| 2012/0246853 A1 | * | 10/2012 | Uchiyama ............. A47K 11/10 |
| | | | 15/104.93 |
| 2013/0065055 A1 | | 3/2013 | Bastiolo et al. |
| 2015/0011664 A1 | | 1/2015 | Wycech |
| 2015/0354142 A1 | | 12/2015 | Gambini |
| 2020/0139290 A1 | | 5/2020 | Rocklitz |
| 2022/0243401 A1 | * | 8/2022 | Backfolk .............. D21H 23/48 |

\* cited by examiner

STARCH-BASED PACKAGING MATERIAL, APPARATUS AND METHOD FOR MAKING SAME

FIELD OF THE INVENTION

This invention relates to packaging materials, and more particularly, to environmentally friendly packaging materials made from starch. The invention further relates to equipment and methods for making packaging materials including extrusion of expanded starch in the form of a tube which is slit and opened up into a sheet by forced air.

BACKGROUND OF THE INVENTION

Commonly used polystyrene, polypropylene, polyethylene, and other plastic-containing materials have been used in packaging applications for many years. Foamed plastic materials perform their intended purpose well and are available in many forms such as loose fill (peanut) and sheet form. For example, a closed cell foamed polystyrene known as Styrofoam™ is well known and has been in use as a packaging material for over 70 years. Plastic-containing materials are not considered to be environmentally friendly despite improvements in manufacturing and recycling operations.

Biodegradable materials having properties comparable to plastic-containing materials are in high demand for use in packaging applications. Starch-based materials in sheet form are known but conventional extrusion of starch produces expanded products that lack desired mechanical properties such as flexibility and resiliency. Chemically modified starches and blends of starch with synthetic polymers are known and have enabled the use of starch in packaging applications with limited success.

SUMMARY OF THE INVENTION

In a first aspect, the invention pertains to a packaging material comprising a cellulosic web laminated between layers of expanded starch. The cellulosic web can be a paper towel material. The layers of expanded starch can be fluted. The packaging material can include a stack of a plurality of alternating cellulosic webs between layers of expanded starch.

In another aspect, the invention pertains to an extrusion die having a generally annular opening with in inner edge and an outer edge, wherein at least one edge of the opening has a shape of a non-circular closed curve shape. The inner edge and the outer edge can have segments corresponding to overlapping circles, or the inner edge and the outer edge can have scalloped shapes, or the outer edge can be circular and the inner edge can be scalloped.

In another aspect, the invention pertains to an apparatus comprising: an extruder with a generally annular die; a funnel positioned to receive a tubular extrudate from the annular die; a first blower configured to deliver air in the funnel around the exterior of the extrudate; calendering rollers; and a blade oriented to slit the tubular extrudate between the die and the rollers to form a sheet for passage through the calendering rollers. The apparatus can comprise a second blower and a conduit projecting into the funnel configured to blow air from the second blower into the center of the slit tube. The apparatus can further comprise calendering rollers positioned outside the funnel and configured to condition a sheet formed from the slit tube after the slit tube exits the funnel.

In another aspect, the invention pertains to a method for forming an expanded sheet comprising starch. The method comprises receiving an extruded, expanding tube of material comprising starch, into a conduit; propelling the tube down the conduit, in some embodiments with a Venturi effect, by delivering forced air from a first blower and around the tube; and slitting the tube with a blade. The method can comprise facilitating opening of the slit portion of the tube by delivering air from a second blower. The slit portion of the tube exits the conduit and can be calendered and cut into sheets. The sheets can be stacked alternately with paper towels or other cellulosic material, followed by laminating to form a composite packaging material.

DETAILED DESCRIPTION OF THE INVENTION

Figure 1A:
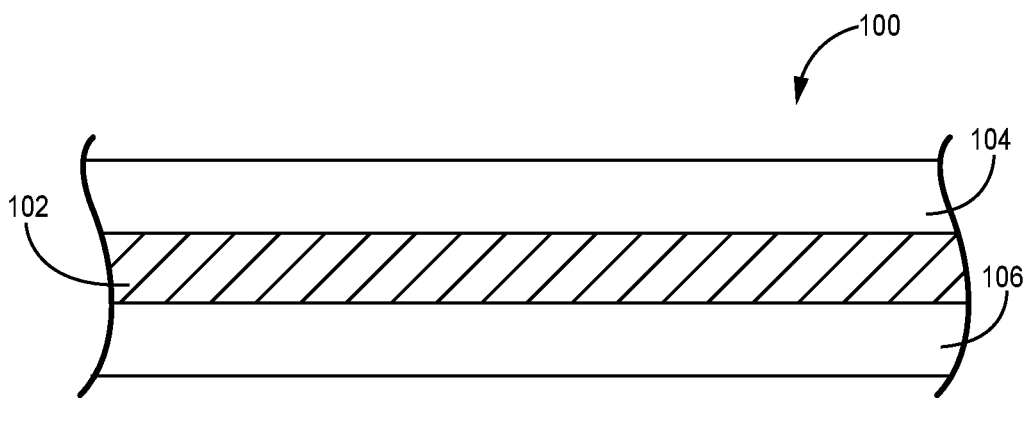
FIGS. 1A and 1B are side views of exemplary packaging materials having layers of expanded starch with cellulosic web disposed between the layers.

Sheets of starch-based foamed material can be formed with joined layers with cellulosic binding sheets between the starch layers, and the individual starch-based sheets or corresponding layers can be formed with improved extrusion techniques that can provide greater selectivity in the resulting sheet structure. Previously developed starch-based extrusion processes or improved extrusion processes expressed herein can be adapted to forming a layered structure to provide a convenient approach to forming thicker, sturdier composite sheet of material, and the final material can comprise additional layers of joined sheets to achieve a desired final thickness. A cellulose-based material, such as paper towel, can be placed wet between two layers of starch-based sheets to effectively join them together upon lamination. Alternative die shapes are described that can provide altered sheet structures, such as flatter sheets, upon cutting a tube of extruded starch-based material. An eductor structure, similar to a funnel Venturi, is adapted to facilitate a smooth transition between the extruded tube structure and a relatively flat sheet. The naturally cut expanded foam starch sheet formed from an annular die tends to have waves in the structure, which can provide more thermal insulation, but better control of the sheet morphology can be useful to select from a range of useful product configurations.

The packaging material is generally at least partially biodegradable. Biodegradable materials are often broadly defined but generally are materials which can fully return to the earth, for example, by decomposing into chemical compounds that occur naturally. Biodegradable materials can be broken down partially or completely naturally by bacteria, fungi or other biological processes which generally includes time and environment. Biodegradable materials may need to meet criteria, for example, a biodegradable material may need to capable of undergoing physical, chemical, thermal and/or biological degradation in municipal solid waste composting facilities such that some minimum amount of the material is converted into carbon dioxide under certain testing conditions. For example, according to OECD (1992) Guidelines for the Testing of Chemicals 301B, a material is considered biodegradable if at least 5 wt % of the material is converted to carbon dioxide after 30 days when tested as described.

The packaging material of the present invention may be useful in a variety of packaging applications. The packaging material may be used to pack small to large products in standard size containers including boxes, round containers and odd-shaped containers. The packaging material may be used in custom packaging applications where the material is configured to package a particular product in a box or container. The starch-based packaging materials can provide thermal insulation, which can be expressed as an R value, and different sheet configurations can influence the thermal insulating properties.

The lamination to form the multiple layered structure with a plurality of starch sheets bonder together with cellulosic sheets in general can be formed from starch sheets formed by various processes and with somewhat different compositions having any amount of starch, although generally at least about 55 weight percent starch, depending on the desired properties of the sheets and the packaging material. The discussion herein though focuses on a desirable processing approach based on extruding the sheets from dense starch pellets that provide for a fast and efficient sheet extrusion. The process improvements for extruding and forming the starch sheets focus on the water based expansion of the extrusion from the starch pellet input material.

When the starch is extruded as a cylindrical extrudate that expands on exiting the extruder, the cut material generally forms a sheet with waves oriented generally parallel to the extrusion direction. In other words, the dips and crests vary across the sheet, and the lengths of the waves extend in the same direction as the grain of the sheet, i.e., in the extrusion direction. These longitudinal waves can be somewhat desirable in some applications by providing stagnant air insulation as a packing material. Several techniques are described that attempt to control and optionally reduce the waviness of the sheets to allow for forming a flatter sheet. For example, the use of an alternative die shape can alter the morphology of the expanded sheet upon flattening. Also, the use of an eductor with a funnel shape provides for a controlled gradual unrolling of the cut starch extrudate that can then be run through calendering rollers to flatten the sheet.

The packaging material may comprise layers or sheets of starch directly in contact with each other. In this embodiment, the packaging material can made by wetting or moistening either surface of the top and bottom sheets, or both surfaces of the top and bottom sheets. The addition of water or moisture in general can be used to increase stickiness or adhesion of the sheets, especially to each other.

The packaging material may comprise a web or sheet that holds layers or sheets of starch together. The stacking of sheets can provide a greater thickness product than can easily be obtained directly from the extrusion process with readily available equipment. The web may comprise a biodegradable material such as a natural product. The web may be fibrous and woven or nonwoven. The web may have particular wetting properties that facilitate the bonding process and can be adjusted depending on the desired properties of the packaging material. Generally, the web may be hygroscopic to facilitate bonding to the starch sheets.

In some embodiments, the packaging material comprises a cellulosic web that is generally a web of cellulosic fibers that may be described as paper or fabric. The cellulosic fibers may be held together by any suitable means known in the paper arts, and generally involves among other characteristics entanglement of the fibers. The cellulosic web may comprise virgin fibers, recycled fibers, or a combination thereof. The fibers may be derived from any of a variety of plant sources, such as softwood sources such as pine or cedar, hardwood sources such as maple and oak, grasses, such as bamboo or straw, and/or from plants such as cotton. The fibers may be physically modified, and/or they may be chemically modified, for example, by being crosslinked with crosslinking agents or impregnated with complexing agents as is known in the art of paper making.

The cellulosic web may comprise any amount of cellulosic fibers, from about 50 wt % to about 100 wt %, from about 60 wt % to about 100 wt %, or from about 80 to about 100 wt % of cellulose fibers based upon the total weight of the web. A person of ordinary skill in the art will recognize that additional ranges of fiber content within the explicit ranges above are contemplated and are within the present disclosure. Other components present in the cellulosic web can include, for example, antimicrobial agents, clays, sizing, inorganic fillers and the like.

In some embodiments, the cellulosic web may comprise a paper towel. Suitable paper towels include commercially available paper products, such as rolls of commercial paper towels of those referred to as C-fold, Z-fold or multifold paper towels which are generally available in stacks and depending on the fold, the paper towels may be interlocked with one another. Paper towels useful in the present invention also include embossed paper towels available as perforated sheets in roll form and often referred to as kitchen paper towels. The paper towels may or may not be lint-free. The paper towels may be single ply, or 2- or 3-ply, and may be constructed for single use or repeated use such that they can be washed and reused multiple times before they are disposed.

In general, any reasonable cellulosic web can be effective, but in some embodiments, the particular cellulosic web selected for use in the packaging material may depend upon any number of factors, for example, the thickness and chemical composition of the expanded starch layers between which the cellulosic web is disposed. The cellulosic web is generally a water absorbent web in which water is absorbed into and between cellulosic fibers. As used herein, water absorption refers to the increase in mass, as a percentage of dry mass, when the cellulosic web is contacted with water and allowed to wet, followed by removal of excess water. The water can help effectuate the bonding of the laminated layers.

The cellulosic web may be selected based on the procedure being used, such that it can be easily handled and layered as described below to form the packaging material. The web may have any suitable thickness as long as the desired properties of the packaging material are obtained. The web may have a thickness no more than about 2 mm, no more than about 1 mm, no more than about 0.8 mm, or no more than about 0.5 mm. A person of ordinary skill in the art will understand that additional ranges within the explicit ranges of thicknesses above are contemplated and are within the present disclosure.

Fibrous sheets, such as those used for paper towels are described further in the following patent applications: published U.S. patent applications 2005/0069679 to Stilljes, Jr., et al., entitled "Embossed Multi-ply Fibrous Structure Product and Process for Making the Same," 2015/0354141 to Gambini, entitle "Multilayer Sheet," and Australian patent application 2019455809 to Hu, entitled "Paper Towel and Method for Manufacturing the Same," all three of which are incorporated herein by reference. Paper towels can comprise polyvinyl alcohol as an adhesive.

In some embodiments, the packaging material may comprise an adhesive which holds the layers of starch together. Many types of adhesives are known and may be used as long as the desired properties of the packaging material are obtained. The adhesive may comprise a polymeric composition, an adhesive that forms by drying of a layer of a glue, or an adhesive that forms by curing where covalent bonds between components are formed. The adhesive may comprise a biodegradable material such as a natural product, for example, gelatin or dextrin. The adhesive may comprise a craft glue, a wood glue, a glue suitable for use in leather and garment construction. The adhesive may comprise a pressure sensitive adhesive. The adhesive may be a synthetic glue such as a 1- or 2-part epoxy, a water or solvent borne polyurethane, a cyanoacrylate, or a polycarbonate. The adhesive, when applied, may be in the form of a liquid including liquids that can be applied by spraying, or it can be a paste, a film or it may be in solid form such as in a stick form or as is known for a hot melt adhesives. Useful adhesives may include inorganic and organic substances, compounds, etc. that are not typically described as adhesives. For example, a suitable polyvinyl alcohol may be used as an adhesive for holding the layers of starch together.

The adhesive may be applied such that the layer between the layers of starch has a thickness of no more than about 2 mm, no more than about 1 mm, no more than about 0.8 mm, no more than about 0.5 mm, or no more than about 0.3 mm. A person of ordinary skill in the art will understand that additional ranges within the explicit ranges of thicknesses above are contemplated and are within the present disclosure.

The packaging material comprises layers of foamed starch, also referred to as expanded starch, that may be provided in the form of free standing sheets. As described below, expanded starch is formed by extrusion of starch-based resin material using water as an expansion agent. In general, the expanded starch may be extruded in the form of sheets, or as described below, in the form of a tube which is then slit and opened up by forced air.

The expanded starch sheets may comprise any type of starch, for example, starch obtained from corn, potato, maize, tapioca, wheat, sorghum, rye, rice, pea, other plants and combinations thereof. The expanded starch sheets may be made using natural purified starch, or a chemically or physically modified starch, or a combination thereof. The expanded starch sheets may comprise at least about 50 wt % starch, from about 55 wt % to about 95 wt % starch, or from about 65 wt % to about 95 wt % starch. A person of ordinary skill in the art will understand that additional ranges within the explicit ranges of starch content above are contemplated and are within the present disclosure.

The expanded starch sheets are hygroscopic, and may have a moisture content depending upon the particular starch and components present in the sheets as well as their respective amounts. For example, the expanded starch sheets may comprise up to about 50 wt % water, up to about 30 wt % water, from about 10 wt % to about 50 wt % water, or from about 10 wt % to about 30 wt % water. A person of ordinary skill in the art will recognize that additional ranges of water besides the above are contemplated and are within the scope of the present disclosure.

The expanded starch sheets may comprise other components blended and expanded with the starch. These other components may be present because of how the starch is provided for extrusion. For example, as described below, the starch may be provided in the form of dense pellets, and one or more plasticizers may be present in the pellets to disrupt any crystalline structure formed by the starch. In particular, the expanded starch sheets, may comprise polymeric plasticizers such as polyvinyl alcohol or copolymers of polyvinyl alcohol. Useful polyvinyl alcohols and copolymers thereof have a moderate degree of hydrolysis, for example, those available from Kuraray America, Inc. (Kuraray Poval™). Exemplary copolymers of polyvinyl alcohol include ethylene vinyl alcohol copolymer, propylene vinyl alcohol copolymer, vinyl acetate-vinyl alcohol copolymers, and the like. The expanded starch sheets generally comprise from about 2 wt % to about 30 wt %, in further embodiments from about 3 wt % to about 25 wt %, and in other embodiments from about 4 wt % to about 22 wt % plasticizing polymers such as polyvinyl alcohol or copolymers thereof.

Other plasticizers may be used in the expanded starch sheets, in addition to or in place of polymeric plasticizers. Other useful plasticizers include polyols such as glycerin, propylene glycol, ethylene glycol, and the like, in concentrations of from about 0 to about 10 wt %, or in further embodiments from about 0.5 wt % to 7 wt %. A person of ordinary skill in the art will recognize that additional ranges of plasticizing polymer and/or plasticizer within the explicit composition ranges above are contemplated and are within the scope of the present disclosure.

The expanded starch sheets may comprise elastomeric or lower melting thermoplastic polymers (from 0 to about 10 wt % and in further embodiments from about 0.5 wt % to 7 wt %), emulsifiers (from 0 to about 10 wt % and in further embodiments from about 0.5 wt % to 5 wt %), structural polysaccharides (from 0 to about 30 wt % and in further embodiments from about 0.5 wt % to 15 wt %), plant fibers (from 0 to about 30 wt % and in further embodiments from about 0.5 wt % to 15 wt %), bark (from 0 to 3 wt % and in further embodiments from 0.25 wt % to 1.5 wt %), lignins (from about 0 to about 5 wt % and in further embodiments from 0.5 wt % to 2 wt %), clay minerals (from 0 to about 5 wt % and in further embodiments from about 0.25 wt % to about 2.5 wt %), talc (from 0 to about 5 wt % and in further embodiments from about 0.25 wt % to 2.5 wt %), and/or other additives from 0 to 5 wt %. A person of ordinary skill in the art will recognize that additional ranges of additive concentrations within the explicit ranges above are contemplated and are within the present disclosure.

Suitable elastomeric or lower melting thermoplastic polymers include, for example, polyethylene, polyisoprene, rubber, styrene butadiene copolymer, ECOFLEX (BASF), ethylene vinyl acetate, copolymers thereof, mixtures thereof, and the like. Suitable emulsifiers include, for example, commercial food emulsifiers or one of a large number of commercially available surfactants. Structural polysaccharides include, for example, cellulose, cellulose derivatives, chitosan, chitin, pectin, derivatives thereof, and mixtures thereof. Clay minerals include, for example, kaolin, other aluminum phyllosilicates, and mixtures thereof.

The expanded starch sheets may have any density depending on the particular packaging application. Generally, the expanded starch sheet may have a density of no more than about 10 lbs/ft$^3$, in further embodiments no more than about 6 lbs/ft$^3$, in further embodiments no more than about 5 lbs/ft$^3$ and in other embodiments from about 0.5 lbs/ft$^3$ to about 5 lbs/ft$^3$. A person of ordinary skill in the art will recognize that additional ranges within the explicit ranges of density ratios and extruded product density are contemplated and are within the present disclosure.

In some embodiments, the expanded starch sheet comprises at least about 55 wt % starch, is free of $CO_2$ at a concentration above ambient concentration, and has a bulk density between about 0.5 and about 5.0 lbs/ft$^3$, wherein the starch is not enriched.

Figure 1B:
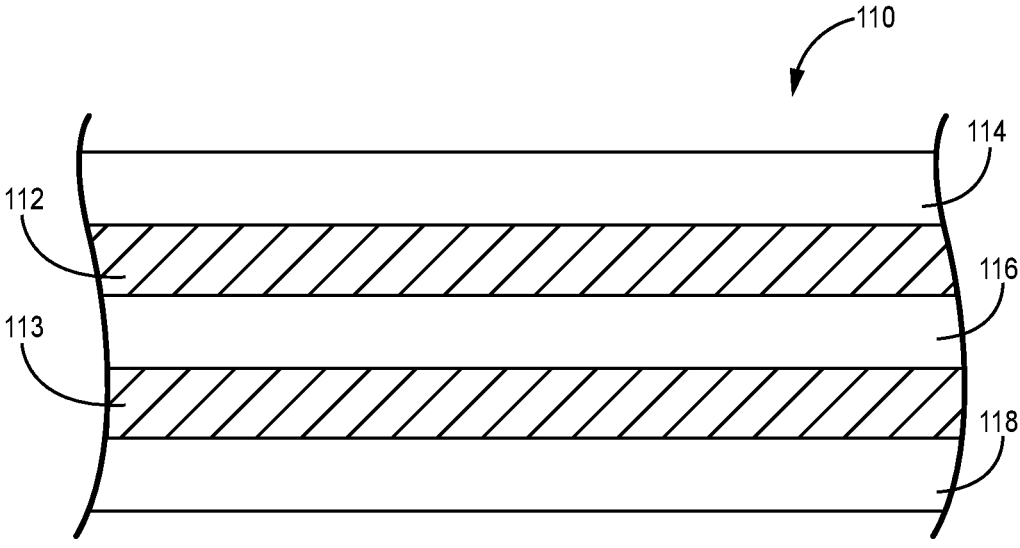

Exemplary packaging materials of the present invention are shown in FIGS. 1A and 1B. In FIG. 1A, packaging material 100 comprises a three layer structure with cellulosic web 102 disposed between layers of expanded starch 104 and 106. Depending on the particular packaging application, the packaging material can include additional alternating layers. In FIG. 1B, packaging material 110 comprises a five layer structure or stack with cellulosic webs 112 and 113 alternating with expanded starch layers 114, 116 and 118.

Preparation of the packaging material is described for the three layer structure shown in FIG. 1A. In some embodiments, the packaging material is prepared by laying a first layer or sheet of the expanded starch 106 on a generally flat sturdy surface, followed by placing cellulosic web 102 on the sheet. Cellulosic web 102 is wetted with water, for example, by spraying or dripping water onto the web. Cellulosic web 102 can be wetted to any extent that is useful, for example, the web can be wetted such that it is damp to the touch or an excess water can be applied to the web such that water would drip from the web if it were so positioned. In the latter case, excess water could be blotted from the web or the web could be allowed to dry to remove a certain amount of water. In some embodiments, cellulosic web 102 can be wetted any extent that is useful, and then positioned on expanded starch sheet 106. Second expanded starch sheet

104 is positioned on the wetted cellulosic web to form a three layer structure. Packaging material 100 may comprise the three layer structure as formed, or the structure may be pressed with a roller, allowed to dry under ambient conditions, or dried by warming or heating.

Preparation of packaging material having more than two layers of expanded starch and a cellulosic web is described for the five layer structure shown in FIG. 1B. In some embodiments, a three layer structure comprising first and second layers of expanded starch 118 and 116, respectively, with first cellulosic web 113 disposed between the layers is prepared as described above for FIG. 1A. Second cellulosic web 112 is positioned on second layer 116 and wetted onto a top layer of expanded starch. The second cellulosic web is wetted before or after positioning on second layer 116 as described above for packaging material 100. Third layer of expanded starch 114 is positioned on wetted second cellulosic web 112 to form a five layer structure. Packaging material 110 may comprise the five layer structure as formed, or the structure may be pressed with a roller, allowed to dry under ambient conditions, or dried by warming or heating.

In general, if the packaging material comprises more than one cellulosic web, the webs may be the same or they may be different. In general, the layers of expanded starch can be the same or different. For example, a first layer of expanded starch may be thicker or denser than the second layer.

Figure 2A:
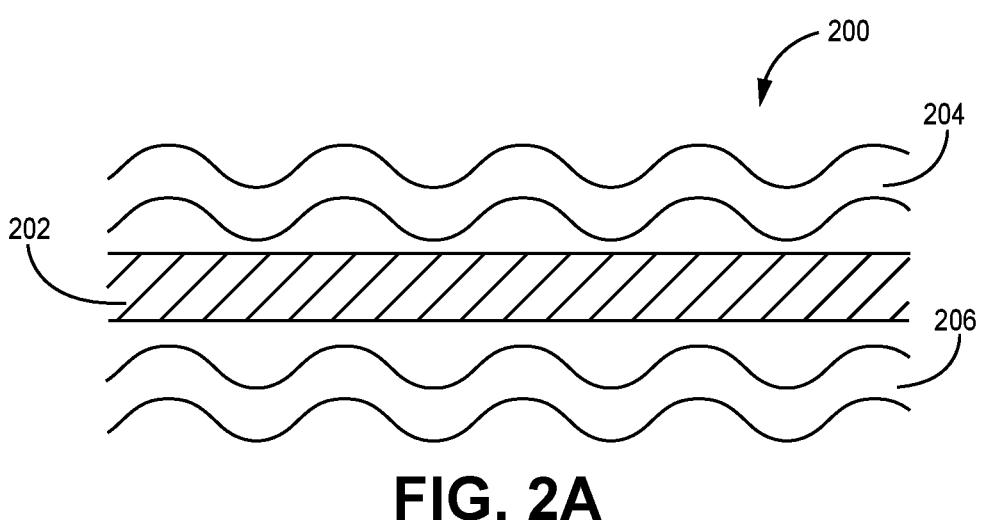
FIGS. 2A and 2B are side views of exemplary packaging materials having layers of fluted expanded starch with cellulosic web disposed between the layers.
Figure 2B:
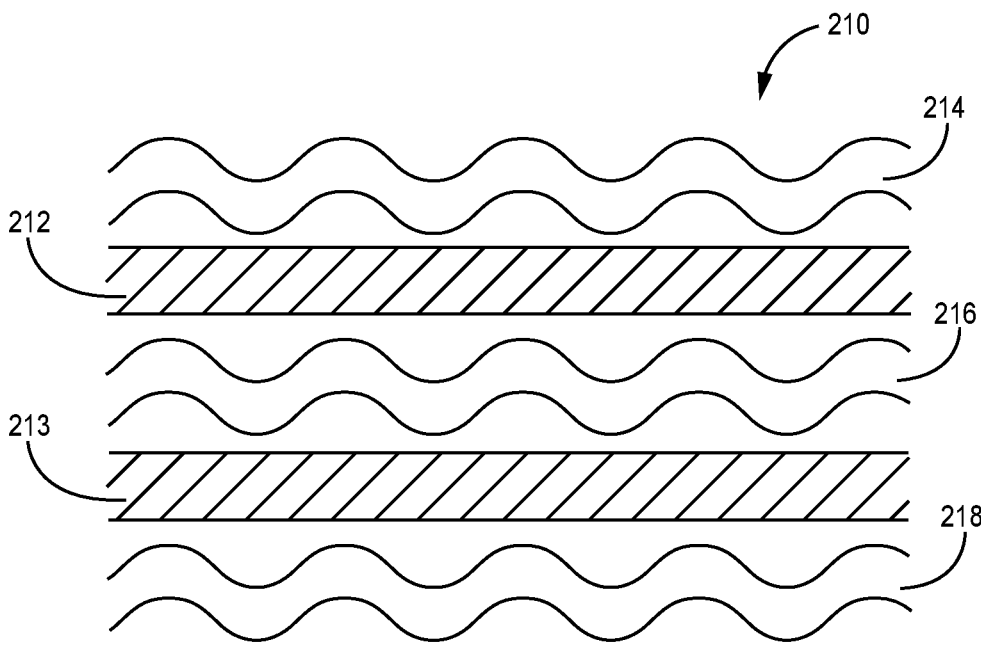

In some embodiments, the packaging material may comprise expanded starch layers or sheets that are fluted as shown, for example, in FIGS. 2A and 2B. In FIG. 2A, packaging material 200 comprises a three layer structure with cellulosic web 202 disposed between layers of expanded starch 204 and 206. The expanded starch layers are generally fluted, i.e., the layers have a curved or wavy pattern. In FIG. 2B, packaging material 210 comprises a five layer structure or stack with cellulosic webs 212 and 213 alternating with expanded and fluted starch layers 214, 216 and 218. For packaging materials having more than one fluted expanded starch layer, the flutes may or may not be vertically aligned as shown in FIGS. 2A and 2B. In general, fluted expanded starch layers may be stacked such that the flutes are not vertically aligned. In general, the layers of expanded starch can be mixed or matched depending on the desired properties of the packaging material. For example, a first layer of expanded starch may be generally flat without flutes and a second layer may be fluted. The use of packaging material with or without fluted starch layers may depend upon the application in which the material is being used.

Figure 3:
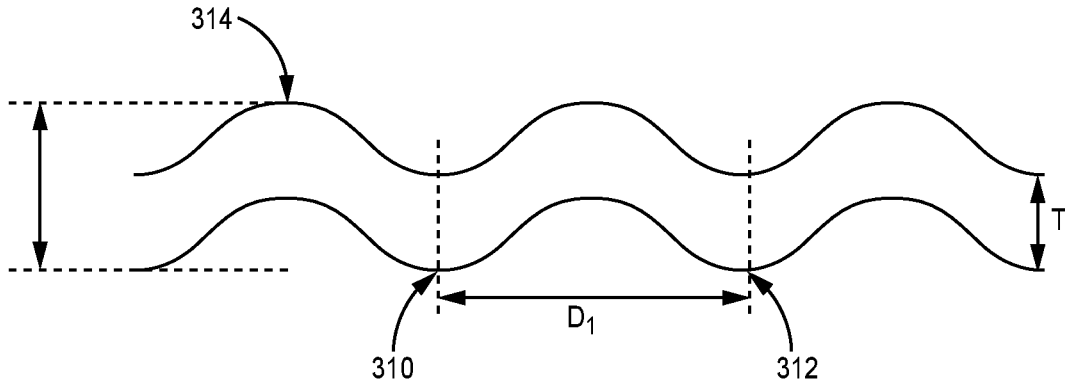
FIG. 3 is schematic side view of a portion of an expanded fluted starch layer.

FIG. 3 is a schematic cross-sectional view of a portion of a fluted starch layer as it exits the extrusion die. A fluted expanded starch layer can have any suitable thickness T, for example, from about 0.005 inches to about 0.50 inches corresponding to the gap opening 410. A fluted starch layer can have any suitable distance $D_1$, which is the distance between maxima 310 and 312 for every other flute. Distance $D_1$ can be any suitable distance as described below for FIGS. 4A-4E. The fluted starch layer if formed into an expanded fluted starch layer as described below, and in general, the flutes of a fluted expanded starch layer will be arranged such that distance $D_1$ varies from flute to flute. A fluted starch layer can have any height H, which is the distance between maxima 314 and 310 of adjacent flutes. Height H can be any suitable distance as described below for FIGS. 4A-4E. In general, the flutes of a fluted expanded starch layer will be arranged such that height varies across the layer even though the layer may be generally flat. A person of ordinary skill in the art will understand that T, D$_1$ and H can be optimized and contemplated within the present disclosure. In general, if thicker stacks of material are desired, additional layers can be added with a cellulosic web between adjacent extruded starch sheets, such as 4 starch sheets, 5 starch sheets, 6 starch sheets, 7 starch sheets or 8 or more starch sheets.

The layers of expanded starch used to form the packaging material are generally provided in the form of sheets. The expanded starch sheets can be formed by extrusion of starch-based pellets, or a collection of pellets, as described in U.S. Pat. No. 10,920,043 B2 to Niles (hereinafter the '043 patent), entitled "Sheets of Starch Based Packing Material, Starch Pellets for Sheet Extrusion and Methods for Forming the Pellets and Sheets," incorporated herein by reference (hereinafter referred to as the '043 patent to Niles. As described further below, the starch-based pellets are dense, i.e., not significantly expanded with voids, and the processing to form the pellets is appropriately designed to achieve a high density. The starch-based pellets comprise plasticizers which may be particularly effective for efficient processing as described below. In alternative embodiments, starch sheets for assembling into stacks can be formed using other approaches or using extrusion of starch material directly rather than from pellets, as described, for example, in published U.S. patent application 2009/0324913 to Bastioli et al. (hereinafter the '913 application), entitled "Sheet and Product Based on Foamed Shaped Starch," incorporated herein by reference.

The starch-based pellets comprise starch which is a natural polysaccharide or carbohydrate that comprises primarily glucose monomers assembled into the polymer. Carbohydrate groups in the starch can comprise cations that can be adjusted, and the pH can also be adjusted. Starches are generally of vegetable origin and can be modified using chemical or physical (gelatinized or cooked) processes. Starch derivatives are described further in U.S. Pat. No. 5,095,054 to Lay et al., entitled "Polymer Compositions Comprising Destructurized Starch," incorporated herein by reference. Starch as used herein generally refers to natural purified starch as well as modified starch and combinations thereof. Suitable sources for starch include, for example, corn, potato, maize, tapioca, wheat, sorghum, rye, rice, pea, other plants and combinations thereof.

Any suitable starch-based pellets can be employed, provided the desired properties of the expanded starch sheets or layers are obtained as described below. Suitable starch-based pellets are described in the '043 patent to Niles. The pellets are formed by cooking a blend of a starch powder and other ingredients to form a dense composite material.

The starch-based pellets can include starch derived from a variety of sources as described above. Generally, the starch-based pellets comprise from about 30 wt % to about 95 wt % starch, from about 55 wt % to about 95 wt % starch, in further embodiments from about 60 wt % to about 93 wt %, and in additional embodiments from about 65 wt % to about 92 wt % starch. These ranges include the natural moisture content of the starch. (Commercial starch comprises some natural moisture content that is generally stable at room temperature.) A person of ordinary skill in the art will recognize that additional ranges of starch content within the explicit ranges above are contemplated and are within the present disclosure.

The starch-based pellets can comprise any reasonable amount of water in order to obtain the desired products and processing performance. The water content of the pellets is based on an evaluation of the total moisture level regardless of whether the water is due to the natural moisture content of the starch or if added during formation of the pellets. Moisture content can be evaluated using a heated scale, in which the pellets are heated to drive out the moisture, and the weight change is correspondingly measured. The pellets can comprise a total moisture level of from about 10 wt % to about 30 wt % water, in further embodiments from about 11 wt % to about 28 wt % water, in other embodiments from about 12 wt % to about 25 wt % water, and in additional embodiments from about 13 wt % to about 23 wt % water. A person of ordinary skill in the art will recognize that additional ranges within the explicit ranges above are contemplated and are within the present disclosure. In some embodiments, the starch-based pellets have sufficient water content such that the pellets have a glass transition temperature of from 210° F.-550° F. In any case, the extrusion of the starch can be performed under suitable conditions in an extruder to form expanded products quickly and efficiently from commercial single screw extruders. Following expansion, the material generally behaves as a thermoset polymer.

The starch-based pellets may comprise additives such as thermoplastic plasticizing polymers, elastic polymers, emulsifiers, structural polysaccharides, plant fibers, lignins, clay minerals, talc, and other polymers. In particular, the starch-based pellets generally comprise a polyvinyl alcohol, copolymers thereof, other plasticizing polymers suitable for starch, or a combination thereof. The starch-based pellets generally comprise from about 2 wt % to about 30 wt %, in further embodiments from about 3 wt % to about 25 wt %, and in other embodiments from about 4 wt % to about 22 wt % plasticizing polymers. For expanded starch products, the plasticizing polymers generally used have been polyvinyl alcohol, copolymers thereof, derivatives thereof and mixtures of the foregoing. Polyvinyl alcohol generally is derived from hydrolysis of a polyvinyl ester, and polyvinyl alcohol grades can be specified according to the degree of hydrolysis. For these applications, the polyvinyl alcohol generally has a moderate degree of hydrolysis. Suitable polyvinyl alcohol resins are available, for example, from Kuraray America, Inc. (Kuraray Poval™). Suitable polyvinyl alcohol copolymers include, for example, ethylene vinyl alcohol copolymer, propylene vinyl alcohol copolymer, vinyl acetate-vinyl alcohol copolymers, and the like. The hydroxyl groups of the polyvinyl alcohol can disrupt the crystalline structure of starch to function as a plasticizer for starch. While polyvinyl alcohol itself generally is crystalline, it is soluble in water so that with sufficient water present, the polyvinyl alcohol can plasticize starch. Other polyols, such as glycerin, propylene glycol, or ethylene glycol, can also plasticize starch, and can be included in concentrations from about 0 to 10 wt % and in further embodiments from about 0.5 wt % to 7 wt %. A person of ordinary skill in the art will recognize that additional ranges of plasticizer within the explicit composition ranges above are contemplated and are within the scope of the present disclosure.

Furthermore, the pellets can comprise elastomeric or lower melting thermoplastic polymers (from 0 to about 10 wt % and in further embodiments from about 0.5 wt % to 7 wt %), emulsifiers (from 0 to about 10 wt % and in further embodiments from about 0.5 wt % to 5 wt %), structural polysaccharides (from 0 to about 30 wt % and in further embodiments from about 0.5 wt % to 15 wt %), plant fibers (from 0 to about 30 wt % and in further embodiments from about 0.5 wt % to 15 wt %), bark (from 0 to 3 wt % and in further embodiments from 0.25 wt % to 1.5 wt %), lignins (from about 0 to about 5 wt % and in further embodiments from 0.5 wt % to 2 wt %), clay minerals (from 0 to about 5 wt % and in further embodiments from about 0.25 wt % to about 2.5 wt %), talc (from 0 to about 5 wt % and in further embodiments from about 0.25 wt % to 2.5 wt %), and/or other additives from 0 to 5 wt %. A person of ordinary skill in the art will recognize that additional ranges of additive concentrations within the explicit ranges above are contemplated and are within the present disclosure. Suitable elastomeric or lower melting thermoplastic polymers include, for example, polyethylene, polyisoprene, rubber, styrene butadiene copolymer, ECOFLEX (BASF), ethylene vinyl acetate, copolymers thereof, mixtures thereof, and the like. Suitable emulsifiers include, for example, commercial food emulsifiers or one of a large number of commercially available surfactants. Structural polysaccharides include, for example, cellulose, cellulose derivatives, chitosan, chitin, pectin, derivatives thereof, and mixtures thereof. Clay minerals include, for example, kaolin, other aluminum phyllosilicates, and mixtures thereof.

The starch-based pellets can be irregular shaped granules, which can be similar to small crushed rock or gravel. One way to evaluate pellet size for a particular pellet is to consider the longest diameter between two points of the pellet, which generally relates to the size of a cube into which the pellet can fit based on the diagonal between two opposite corners of the cube. The average pellet size can be such that it would fit within a cube ranging in size from about 0.01 inch regular cube to a 2 inch regular cube, in further embodiments from about 0.02 inch to about 1.5 inches, and in additional embodiments from about 0.025 inches to about 1 inch, wherein the cube dimension refers to the length of an edge of the cube. In some specific embodiments, the average pellet size would fit within a regular cube with an edge from about 1/16 inch to about 1/4 inch. A person of ordinary skill in the art will recognize that additional ranges of particle size within the explicit ranges above are contemplated and are within the present disclosure. The upper limit on particle size can be constrained by the size that can reasonably be loaded into an extrusion barrel to extrude the final product.

The starch-based pellets can be dense, i.e., not significantly expanded with voids, and the processing to form the pellets is appropriately designed to achieve a high density. The high density of the pellets is consistent with an appropriate amount of cooking and plasticizing of the starch component, in which too little cooking or excessive cooking can result in lowering of the density. The properly plasticized dense pellets are particularly effective in the efficient processing herein to form expanded product.

Pellet density can be determined in two different ways, either by the density of each individual pellet or by the density of the pellets in collection of pellets or bulk collection, which is referred to herein as bulk density. The density of an individual pellet is the mass divided by the volume of the pellet. The volume of a pellet, or a collection of pellets to evaluate an average, can be determined by submerging the pellet(s) in a liquid that does not dissolve the pellets. Water can be used to measure the volume of the pellets if the measurement is performed promptly before there is significant dissolving or other significant physical changes of the pellets during the measurement. The density of a collection of pellets is lower due to the space between the pellets occupying volume without any mass. The density of the pellets may be somewhat dependent on the moisture level, which can be adjusted as extruded as well as somewhat after extrusion, such as through heating to remove water or the addition of a suitable amount of water in a sealed environment allowing for the uptake of moisture by the pellets. In some embodiments, to lessen any effects of the moisture level on the pellet density measurement, the density of the pellets can be evaluated at a 17 wt % moisture level with adjustment of the moisture level accordingly. The volume of a collection of pellets can be obtained just by placing the pellets into a measuring vessel. For evaluation of the bulk density, generally at least about 100 pellets are used, and if the pellets are produced using the same process parameters, generally the number of pellets greater than 100 should not alter the bulk density measurement significantly. The pellets may have an individual density of from about 65 lbs/ft$^3$ to about 90 lbs/ft$^3$, in further embodiments from about 70 lbs/ft$^3$ to about 85 lbs/ft$^3$, in other embodiments from about 71 lbs/ft$^3$ to about 84 lbs/ft$^3$ (or at least 71 lbs/ft$^3$), in some embodiments from about 72.5 lbs/ft$^3$ to about 83 lbs/ft$^3$, and in additional embodiments, from about 74 lbs/ft$^3$ to about 82 lbs/ft$^3$. The pellets may have a bulk density from about 38 lbs/ft$^3$ to about 60 lbs/ft$^3$, from about 40 lbs/ft$^3$ to about 57 lbs/ft$^3$, and in further embodiments from about 42 lbs/ft$^3$ to about 55 lbs/ft$^3$. A person of ordinary skill in the art will recognize that additional ranges of pellet density within the explicit ranges above are contemplated and are within the present disclosure.

In some embodiments, the starch-based pellets comprise from about 55 wt % to about 95 wt % starch, has an individual density of at least about 71 lbs/cubic foot evaluated at 17 wt % moisture content, and the longest dimension across a pellet is no more than about 2 inches.

In general, the expanded starch-based sheets are by extrusion in a continuous manner or in a discontinuous or batch type manner. Continuous extruders are capable of developing a steady, continuous flow of material, whereas batch extruders operate in a cyclic fashion. Continuous extruders utilize a rotating member or screw, which can also be referred to as an auger conveyor, for transport of the material through the barrel of an extruder. Batch extruders generally have a reciprocating member to cause transport of the material. An extruder is usually designated in part by the diameter of the extruder barrel. In the U. S., the standard extruder sizes may be 3/4, 1, 1-1/2, 2, 2-1/2, 3-1/2, 4-1/2, 6, 8, 10, 12, 14, 16, 18, 20, and 24 inches.

In general, the expanded starch-based sheets are formed from suitable starch-based feed materials such as the starch-based pellets described above. The starch-based feed materials can be extruded in a molten state in a melt fed extrusion system in which the extruder acts purely as a pump, developing the pressure necessary to force the polymer melt through an extrusion die. The extruder barrel can be heated to melt or maintain the material in a melt state.

During basic operation of an exemplary extruder, feed material enters from a feed hopper. Generally, the feed material flows by gravity from the feed hopper down into the extruder barrel. Some materials do not flow easily in dry form and special measures, e.g., mechanical feed components, can be taken to avoid hang-up (bridging) of the material in the feed hopper. As feed material falls down into the extruder barrel, it is situated in the annular space between an extruder screw and barrel, and is further bounded by the passive and active flanks of the screw flight: the screw channel. The extruder barrel is stationary, and the screw rotates to transport material from the hopper to the barrel end where an extrusion die is positioned. As a result, frictional forces act on the material both from the barrel as well as from the screw surface. These frictional forces are responsible for the forward transport of the material.

As the feed material moves forward, it heats up as a result of frictional heat generation and/or heat conducted from the barrel heaters, if present. When the temperature of the feed material exceeds the melting point, a melt film forms at the barrel surface. As the feed material moves forward, the amount of solid material at each location generally reduces as a result of continued melting. It is generally desirable for the material to be completely melted within the barrel, and the polymer melt can be pumped through the extrusion die.

As the polymer flows through the extrusion die, it adopts the shape of the flow channel of the die. Thus, as the polymer leaves the die, its shape initially corresponds to the cross-sectional shape of the final portion of the die flow channel. Since the die exerts a resistance to flow, a pressure is required to force the material through the die. This is generally referred to as the die head pressure. The die head pressure is determined by the shear applied by the screw, the shape of the die (particularly the flow channel), the temperature, and the viscosity of the melt. The release of pressure of the molten material exiting the extrusion die can result in expansion of the material, and the corresponding conditions are selected to encourage such expansion to form the foamed or expanded tubing.

The design of the extrusion die, i.e., the number, shapes and sizes of the one or more openings is influenced by desired properties of the extrudate, the available power and torque of the extruder, the diameter of the screw/barrel, the length over the diameter ratio of the screw, the material being processed, the production volume required, and the like. Selected features of the extrusion die are discussed below. In general, for the starch-based pellets described above, the density of the pellets is such that the extruder in the final product formation does not need to densify the input material to provide for the expansion of the product. The extruder then can have a relatively short barrel and operate at higher shear and pressures so that the expulsion of the material through the die results in the expansion of the material into the foamed product.

The high shear of the extruder pushes the molten starch-based material through die where it rapidly expands when exiting the die. The water in the pellets can function as the expansion fluid or agent to expand the material forming the expanded product, and the pressure differential between the inside and the outside of the barrel facilitate the expansion. In some embodiments, additional water can be added directly into the barrel from water input as described in the '043 patent to Niles, although water can be added with the pellets in feed hopper. In some embodiments, if extra water is added, the amount of extra water can be from about 0.25 wt % to about 10 wt %, in further embodiments from about 0.5 wt % to about 9 wt %, and in other embodiments from about 0.75 wt % to about 7 wt % relative to the pellet weight delivered. A person of ordinary skill in the art will recognize that additional ranges of added water within the explicit ranges above are contemplated and are within the present disclosure.

Further additives can be present in the starch-based pellets. In some embodiments, it can be desirable to not adjust the composition to a large degree other than the possible addition of water such that a longer extrusion dwell time is not needed to form the expanded starch based tube. The moisture content can adjusted through the addition of water to compensate for evaporation from the heated composition during processing and to increase the supply of moisture as an expansion agent. The remaining components of the pellets are generally non-volatile at process temperatures, so their composition is directed carried forward to the expanded starch based tube. Of course, the expanded starch based tube comprises air and possibly trapped moisture in the cells of the expanded material. In some embodiments, no gases are separately infused to expand the product. For these embodiments, the empty space of the expanded material generally holds air and possibly moisture, and does not have enhancement of carbon dioxide or other inert gases over ambient levels in air since carbon dioxide generally is not used for expansion. In alternative embodiments, enhanced levels of carbon dioxide can be present in the sheets to be laminated.

In summary, in some embodiments of particular interest, the expanded material of the expanded starch-based tube comprises the composition of the input pellets with an adjusted moisture level and one or more optional additives at no more than about 5 wt % total and in further embodiments from about 0.5 wt % to about 3 wt % total optional additives, relative to the pellet feed. The optional additives can be mixed with the pellets and added into the extruder barrel with the pellets, and/or the optional additives can be fed into the extruder barrel through a separate input channel. In particular, it can be desirable to add a fine particulate, such as a clay mineral, talc or a combination thereof, to the extruder barrel for the extrusion of the expanded product. The clay mineral/talc can be added additionally or alternatively to the pellet composition. A person of ordinary skill in the art will recognize that additional ranges of additive amounts within the explicit ranges above are contemplated and are within the present disclosure.

The ratio of the density of the starch resin pellet to the expanded starch foam may be adjusted from about 5:1 to about 170:1, in further embodiments from about 10:1 to about 150:1, and in other embodiments from about 80:1 to about 120:1 depending on the process conditions and can be selected within process ranges based upon the end use application. A person of ordinary skill in the art will recognize that additional ranges of additive amounts within explicit ranges above are contemplated and are within the present disclosure.

The design of the extrusion die, i.e., the number, shapes and sizes of the one or more openings is influenced by desired properties of the extrudate, the available power and torque of the extruder, the diameter of the screw/barrel, the length over the diameter ratio of the screw, the material being processed, the production volume required, and the like. Selected features of the extrusion die are discussed below. Alternative die openings are described to alter the shape of the correspondingly formed sheet from the extrusion. In particular, it can be desirable to make one or both edges of the die opening to be non-circular to alter the expansion process upon exiting the extrusion die. Several configurations are shown below.

Figure 4A:
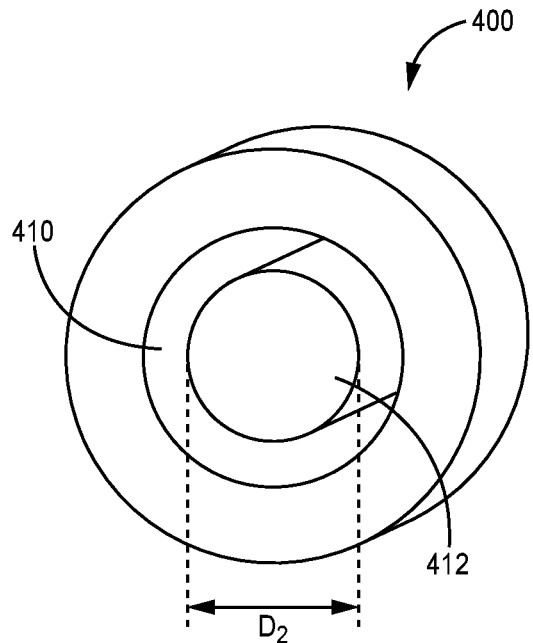
FIG. 4A is a schematic perspective view of an extrusion die with an annular opening.

The material is extruded through a "gap" in the die. Referring to FIG. 4A, which is not necessarily to scale, extrusion die 400 has a generally annular opening 410. FIG. 4A shows a conventional annular opening as contemplated in the '043 patent to Niles, while FIGS. 4B-4E depict embodiments of die opening in which at least one edge of the opening has a non-circular oscillatory shape. Extrusion die 400 can be used to make tubes with thicknesses determined by die opening 410 and diameter $D_2$ which is limited by the barrel size, although the expansion of the sheet material exiting the die provides for an expanded width relative to the die opening. Extrusion die 400 comprises core element 412 supported by a backing or flow plate. The difference between the inner diameter ID and the outer diameter OD of opening 410 is two times the gap range, which in some embodiments is between 0.005 and 0.50 inches, in further embodiments from about 0.01 to about 0.4 inches, and in other embodiments from about 0.02 to about 0.3 inches. In other words the openings have a very small cross section through which the material is extruded. In exemplified embodiments, a die with an annular outer diameter of 1.493 inches and a pin diameter of 1.453 inches, giving a gap of 0.020 inches, was used to form a sheet that is 10 inches wide and 0.150 inches thick which is wavy after unfolding and expansion without calendering. A person of ordinary skill in the art will recognize that additional ranges of gap distance within the explicit ranges above are contemplated and are in the present disclosure. Flutes can occur in the expanded starch when an extrusion die having a smooth annular opening, e.g., the die shown in FIG. 4A, is used.

Figure 4B:
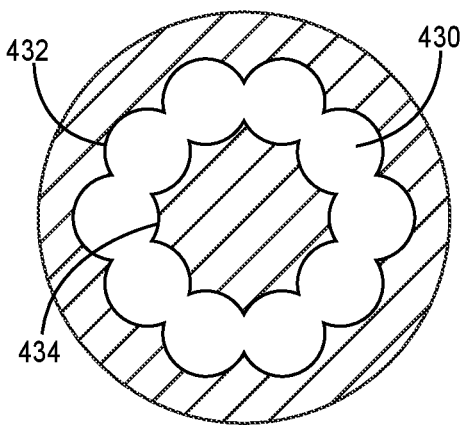
FIG. 4B is a planar front view of a die opening with edges corresponding to overlapping circles.

Referring to FIG. 4B, die-opening 430 is formed between scalloped outer edge 432 and scalloped inner edge 434. In this embodiment, die opening edges 432, 434 roughly approximate the form corresponding to a set of overlapping circles arranged around the periphery as cutouts forming the opening, where the overlapping portions correspond to opening through the die so are not visible, although the outline suggests the shapes. While it may be counterintuitive, a die configured such as that shown in FIG. 4B can be employed to minimize the amplitude and width of the flutes. Scalloped outer edge 432 and/or scalloped inner edge 434 can be angled independently or relative to each other. The angular orientation(s) of any of the openings or segments of the openings can be used to alter the amplitude and width of the flutes depending on desired features of the resulting layers or sheets.

Figure 4C:
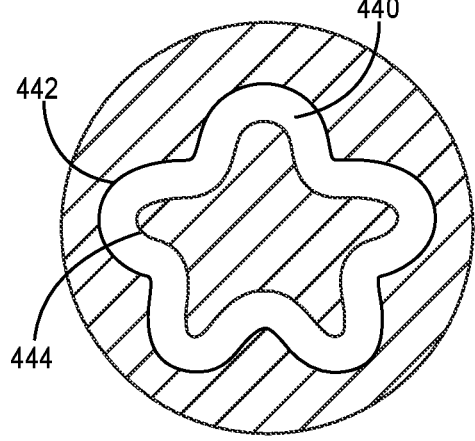
FIG. 4C is a planar front view of a die opening with scalloped inner and outer edges roughly aligned to have an approximately constant radial gap around the central axis.
Figure 4D:
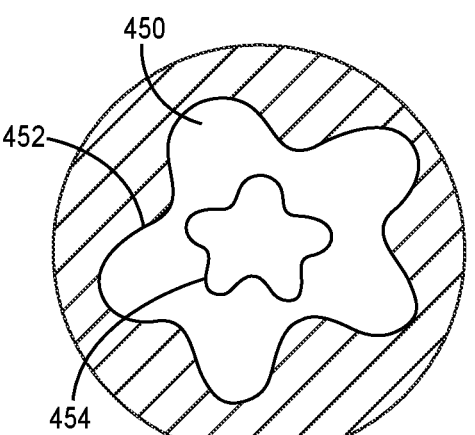
FIG. 4D is a planar front view of a die opening with scalloped inner and outer edges that are misaligned to have an oscillating radial gap around the central axis.
Figure 4E:
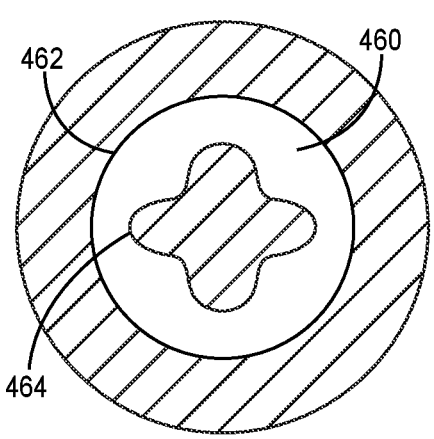
FIG. 4E is a planar front view of a die opening with a circular outer edge and a scalloped inner edge.

FIG. 4C displays an embodiment of a die opening 440 in which the outer edge 442 and the inner edge 444 are each scalloped. In the embodiment of FIG. 4C, scalloped outer edge 442 and inner edge 444 are roughly aligned such that the gap around the circumference can be approximately constant or varying a relatively small amount as desired. In the embodiment of FIG. 4D, die opening 450 has a scalloped outer edge 452 and a scalloped inner edge 454 that are not aligned. The radial gap around die opening 450 oscillates as a result of staggered scalloped edges with a somewhat similar, bur slightly altered shape relative for the embodiment in FIG. 4B. Referring to FIG. 4E, die opening 460 has a circular outer edge 462 and a scalloped inner edge 464. In this way, the surface area along the inner surface can match or be closer to or even exceed the surface area along the outer surface of the extruded structure. Dies configured as shown in FIGS. 4C-4E are envisioned to have the potential to reduce longitudinal flutes. The embodiments on FIGS. 4B-E influence the resulting sheet morphology once the tubular extrudate is slit and unfolded. For the embodiments in FIGS. 4B-E, the corresponding average thickness of the opened sheet is related to the average gap around the die opening accounting for the expansion of the material following extrusion. The average gap has different variations for the different embodiments, but the average gaps generally fall within the ranges described for FIG. 4A.

The expanded starch-based tube can be formed into an expanded sheet material using an apparatus, for example, as shown in FIGS. 5-8. The apparatus generally is designed to guide the expanding extrudate using air to both help to propel the extrudate forward and to assist with the expansion and unfolding process. The movement of starch material through the apparatus can be guided by a baffle or appropriate flow directing ducts can be used to guide the starch extrudate.

Figure 5:
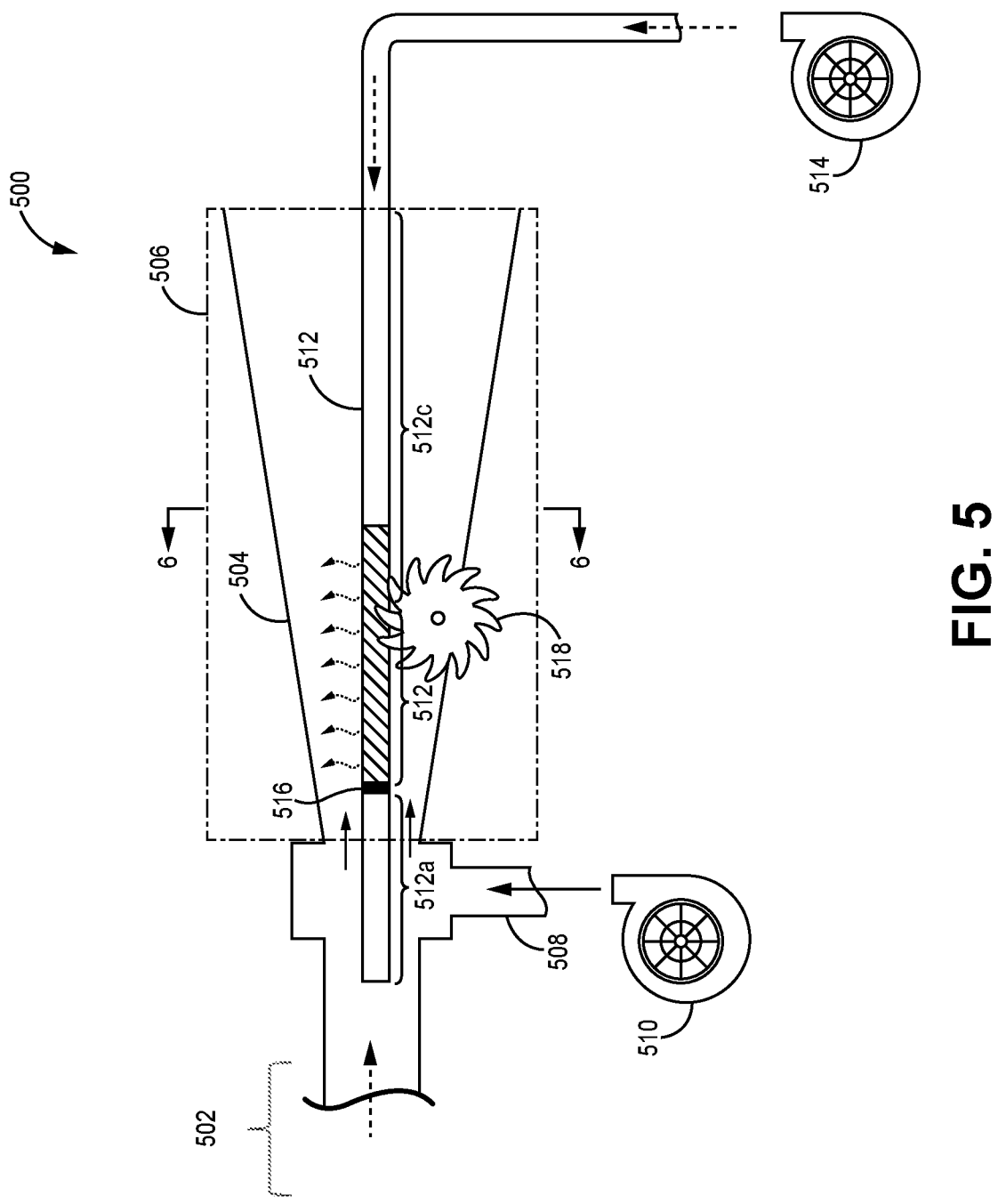
FIG. 5 is a schematic drawing of an apparatus configured for forming expanded starch-based sheets.

In some embodiments, one gas flow is used to propel the extrudate using a Venturi effect, and a second gas flow directed into the extrudate interior facilitates unfolding into a sheet with the aid of the shaped encasement, which can have a portion of a funnel type effect. See FIGS. 5-6. A blade to slit the tubular extrudate to form the sheet can be placed sufficiently away from the die to allow some cooling of the sheet and may be placed before, after or at a position of the encasement/funnel depending on the desired timing of the sheet formation and the encasement/funnel shape. Referring to FIG. 5, Apparatus 500 is a schematic drawing of exemplary apparatus 500 not necessarily drawn to scale. Apparatus 500 may be referred to as a post-processing apparatus, an add-on apparatus, or an accessory and is generally used with an extruder having a generally annular die as described above and shown in FIGS. 4A-4E. Apparatus 500 is configured to receive a tubular extrudate at entrance 502 with a dashed arrow indicating general flow or path by which the extrudate travels. Post-processing of the extrudate is described in the direction of travel of the extrudate, from left to right, also referred to as a forward direction or downstream.

Apparatus 500 includes funnel 504 that is positioned to receive the tubular extrudate into interior space or cavity 506 defined by the funnel, which has functionality essentially of an eductor. Apparatus 500 is configured with opening 508 such that the apparatus accepts forced air provided by first blower 510 with solid arrow indicating the direction of flow of the forced air delivered by first blower 510. A Venturi effect around the tubular extrudate is established by forced air delivered from first blower 510 such that the extrudate is propelled forward.

Apparatus 500 includes air delivery unit 512 configured to receive forced air provided by second blower 514 with a dotted arrow indicating the direction of flow of the forced air delivered by second blower 514. Air delivery unit 512 has an elongated shape and may be shaped as a tube. Air delivery unit 512 is sized and positioned inside funnel 504 such that at least first section 512a becomes inserted into the tubular extrudate as the extrudate advances forward. Air delivery unit 512 includes second section 512b having openings for air from second blower 514 to escape. Air exits from second section 512b, for example, as indicated by wavy dotted arrows. Second section 512b may be designed and configured with any number, size and/or orientation of openings as described further below. Air delivery unit 512 comprises optional plug 516 so that air is forced out of second section 512b. Plug 516 is optional because first and/or second sections 512a and 512b may be designed to prevent air from continuing to travel in a direction opposite to the extrudate.

Figure 6:
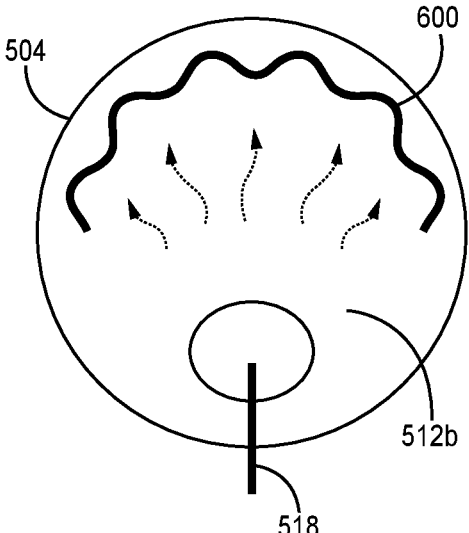
FIG. 6 is a schematic cross-sectional view of a slit portion of a tubular extrudate after the extrudate is opened up by forced air inside a conduit of the apparatus with the cross section taken along line 6-6 of FIG. 5.

Apparatus 500 includes cutting blade 518 for cutting the extrudate as it advances forward. Cutting blade 518 may comprise a stationary cutter such as a blade. Cutting blade 518 may comprise a rotating cutter such as a rotating blade or saw that is mounted on a support structure (not shown) or other suitable cutting element. In general, cutting blade 518 is designed and configured to slit the extrudate as the extrudate advances forward. The top edge of cutting blade 518 extends into a slit in air delivery unit 512 to ensure that the extrudate cannot get past cutting blade 518 without being cut since the uncut extrudate has air delivery unit 512 entering into its center. Forced air from air delivery unit 512, particularly from second section 512b, is directed such that the slit extrudate opens up. For example, in the case of a tubular extrudate, the slit portion of the tube encounters air from second section 512b, and the slit portion opens up, i.e., becomes flatter, when viewed upstream from the open end of funnel 504, which is facilitated by the air from second section 512b. FIG. 6 is a schematic cross-sectional view of a slit portion of a tubular extrudate after extrudate 600 is opened up by forced air from second section 512*b* of air delivery unit 512. The tubular extrudate is opened up by forced air inside the funnel of the apparatus with the cross section taken along line 6-6 of eductor area 506 shown in FIG. 5.

Figure 7:
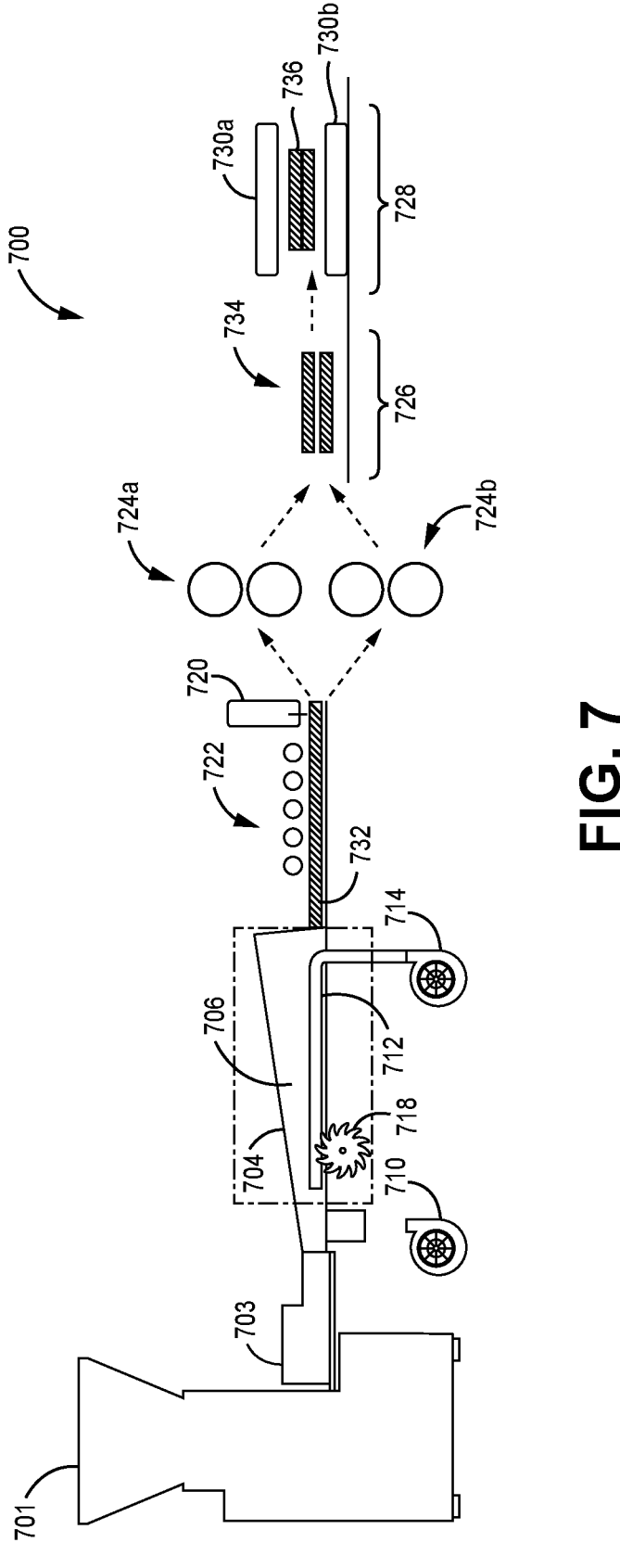
FIG. 7 is a schematic drawing of a system comprising an extruder equipped with a die, the apparatus shown in FIG. 5, and finishing equipment for cutting the extrudate into sheets, followed by calendering the sheets, forming a stack of the sheets, and laminating the stack of sheets to form the packaging material.

FIG. 7 is a schematic drawing of system 700 that may be used to manufacture the packaging material described herein. Extruder 701 and die 703 are configured to extrude a tubular extrudate (not shown) which travels in a direction from left to right. Upon exiting the die, the tubular extrudate enters an apparatus, such as the apparatus described for FIG. 5. Conduit 704, such as air delivery unit 512 of FIG. 5, is positioned to receive the tubular extrudate into interior space or cavity 706 defined by the conduit, which has functionality essentially of an eductor. Forced air is provided by first blower 710, and the forced air creates a Venturi effect around the tubular extrudate such that the extrudate is propelled forward. Air delivery unit 712 expels forced air provided by second blower 714, and cutting blade 718 cuts or slits the extrudate as it advances forward.

The tubular extrudate, in the form of sheet 732 as it exits conduit 704, is calendered by calendar rolls 722 followed by being cut widthwise by blade 720. The sheets are then fed to conveyor rollers alternately into upper and lower slots 724*a* and 724*b*, respectively, as indicated by the dashed arrows. Calendered sheets 734 are transported from slots 724*a* and 724*b* and are stacked on top of each other in stacking area 726 and continue from left to right as indicated by the dashed arrow. The stacked sheets enter lamination area 728 comprising upper and lower lamination plates, 730*a* and 730*b*, respectively. The stacked sheets are laminated to form packaging material 736.

The expanded sheet material which exits the funnel can be flattened with calendering rollers in which the roller gap can be adjusted to apply an appropriate amount of force. The calendering force can be a function of the temperature and moisture as the sheet material cools and dries after exiting the funnel. The cooling and drying can be accelerated, for example with blowers or the like, or allowed to occur by natural interaction with the ambient atmosphere. During the process from the extrusion through the die through the sheet formation process, the starch material undergoes an expansion as water escapes the structure from the heated temperatures of the extruder. The placement of the cutter blade and other features can be adjusted to achieve a desired sheet forming process.

The expanded sheet material can be cut to size and trimmed, such as along the edges. Post processing to achieve a desired shape can provide some modification of the density relative to the extruded density after exiting the funnel. The size and shape of the expanded sheet material are generally only constrained by usefulness of the shape and extrusion die design.

In some embodiments, the expanded sheet material has a thickness of from about ¼ inch to about 6 inches, in further embodiments from about ⅓ inch to about 5 inches, and in other embodiments from about 0.4 inches to about 4 inches. In some embodiments, the expanded sheet material has a width up to about 6 feet, in further embodiments from about 3 inches to about 5 feet and in additional embodiments from about 5 inches to about 4 feet. Thicker and wider sheets can be provided by enlarging the extruder barrel, extrusion die, etc.

The length of the expanded sheet material can generally be selected as desired and cut to that length after the material has exited the eductor, either during extrusion, slitting and expansion, or after the operation has been suspended. A person of ordinary skill in the art will understand that additional ranges of dimensions within the explicit ranges above as well as additional similar shapes are contemplated and are within the present disclosure.

the partially slit tube exits the eductor funnel and is cut widthwise to form foam sheet 800*c*.

Figure 8A:
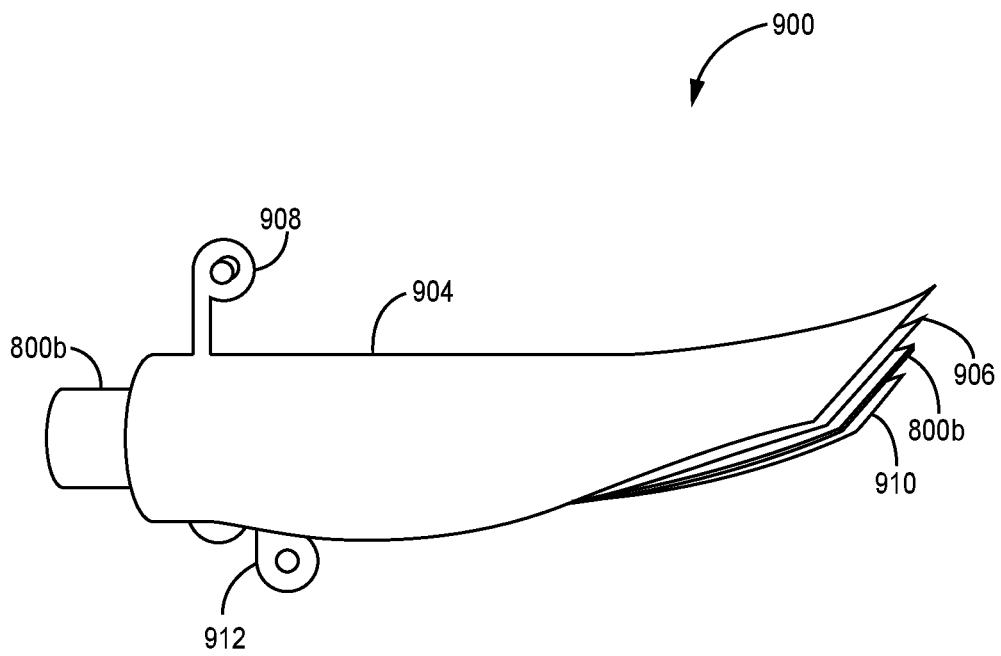
FIG. 8A is a schematic drawing showing a perspective view of an exemplary apparatus configured for forming expanded starch-based sheets.

FIG. 8A is a schematic drawing showing a perspective view of exemplary, alternative apparatus 900 configured for forming expanded starch-based sheets, including tubular extrudate 800*a*, which enters apparatus 900. Apparatus 900 can be used as a conduit portion of FIG. 7. Apparatus 900 is generally tubular and the right hand side of FIG. 8A shows a cross-sectional view of apparatus 900. Apparatus 900 is includes outer-outer conduit 904 and inner-outer conduit 906 positioned inside of the outer-outer conduit such that they are spaced apart from each other, forming a passageway in between the conduits. Conduits 904, 906 transition from a circular cross section to a flattened shape to guide and facilitate flattening of the sheet. First blower 908 is configured to blow air into the passageway in between the conduits. Inner conduit 910 is positioned inside of inner-outer conduit 906, and second blower 912 is configured to blow air inside of the inner conduit. Partially slit foamed tube 800*b* is also shown in FIG. 8A. The foamed tube 800*a* exits the annular extrusion die (not shown) and enters the apparatus such that it surrounds inner conduit 910 and is inside inner-outer conduit 906.

Figure 8B:
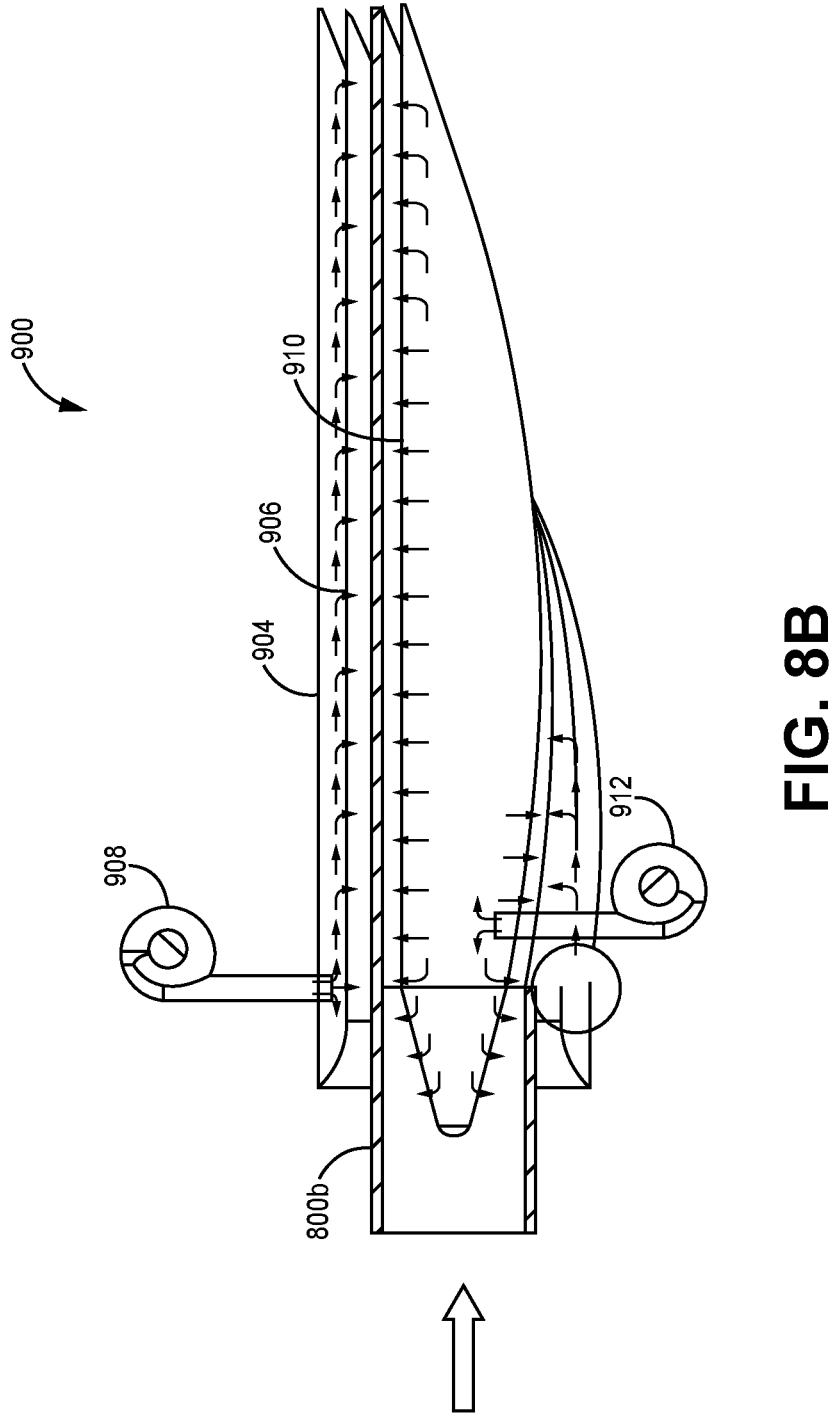
FIG. 8B is a schematic drawing showing a cross-sectional side view of the apparatus shown in FIG. 9A including airflow when the apparatus is in operation.
Figure 8C:
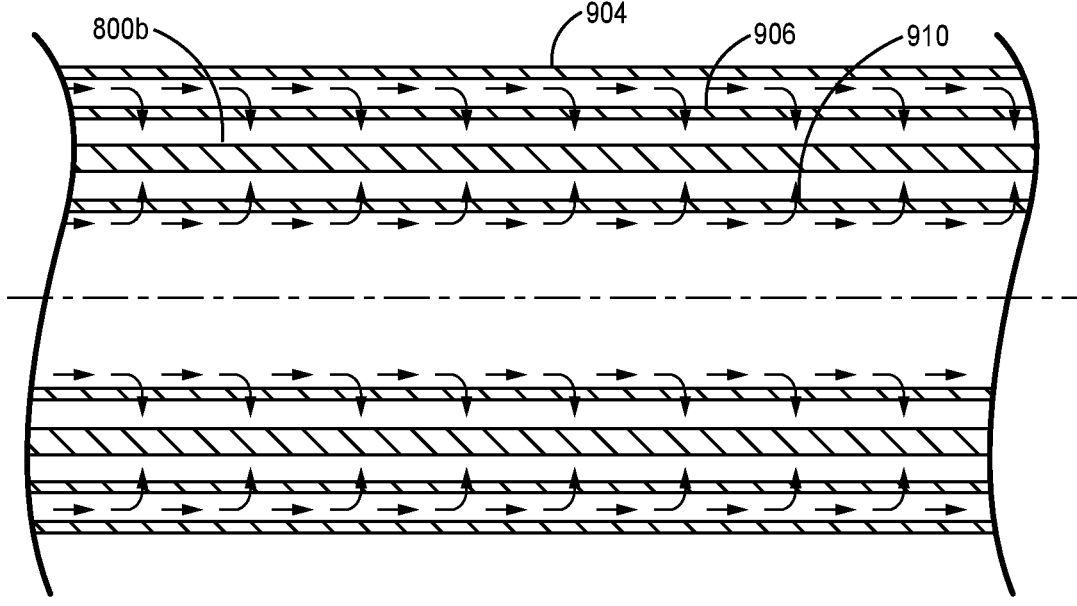
FIG. 8C is a schematic drawing showing a cross-sectional side view of a portion of the apparatus shown in FIG. 9A including airflow when the apparatus is in operation.

FIGS. 8B and 8C show cross-sectional side view of apparatus 900 including airflow when the apparatus is in operation. Forced air from first blower 908 enters the passageway between outer-outer tube 904 and inner-outer tube 906 in a general direction of left to right as indicated by the small arrows. Inner-outer tube 906 includes ports such that some amount of the forced air exits the passageway and impinges on the outer surface of the partially slit foamed tube 800*b*. The shape and diameter of the partially slit foamed tube 800*b* is restrained by the impinging air as the tube travels from left to right as indicated by the large arrow shown in FIG. 8B. Forced air from second blower 912 enters inner tube 910 and exits through ports such that the forced air impinges on the inner surface of the partially slit foamed tube 800*b*. The partially slit foamed tube expands due to the impinging air from the inner tube.

Figure 8D:
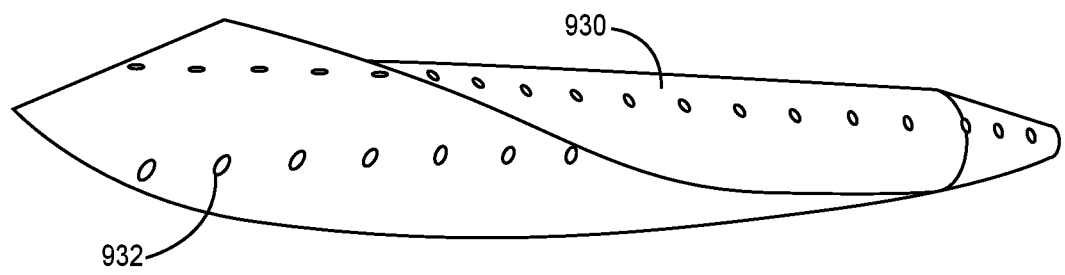
FIG. 8D is a schematic drawing showing an embodiment of an inner outer conduit.

The ports of inner-outer tube 906 and inner tube 910 are suitably angled such that the air impinging on the partially slit foamed tube can assist in moving the foamed tube from left to right. FIG. 8D is a schematic drawing showing an embodiment of an inner conduit 930 with exaggerated port holes 932. The ports are strategically located radially as well as longitudinally to provide the desired airflow characteristics. The airflow provides a cooling and drying effect on the foamed starch as it is being transformed from a tube into a sheet. The foamed starch is generally hot and moist as it exists the extrusion die. The hot and moist foamed starch is a sticky glue-like material that may stick to typical forming dies, molds or mechanisms made of materials such as metal, plastics or ceramics. The airflow can alleviate a potential sticking issue in addition as it moves and shapes the foam starch. In other words, forced air delivered by first blower 908 can be used to suspend the tube or any portion of the slit tube while either or both are inside of the conduit.

Figure 9:
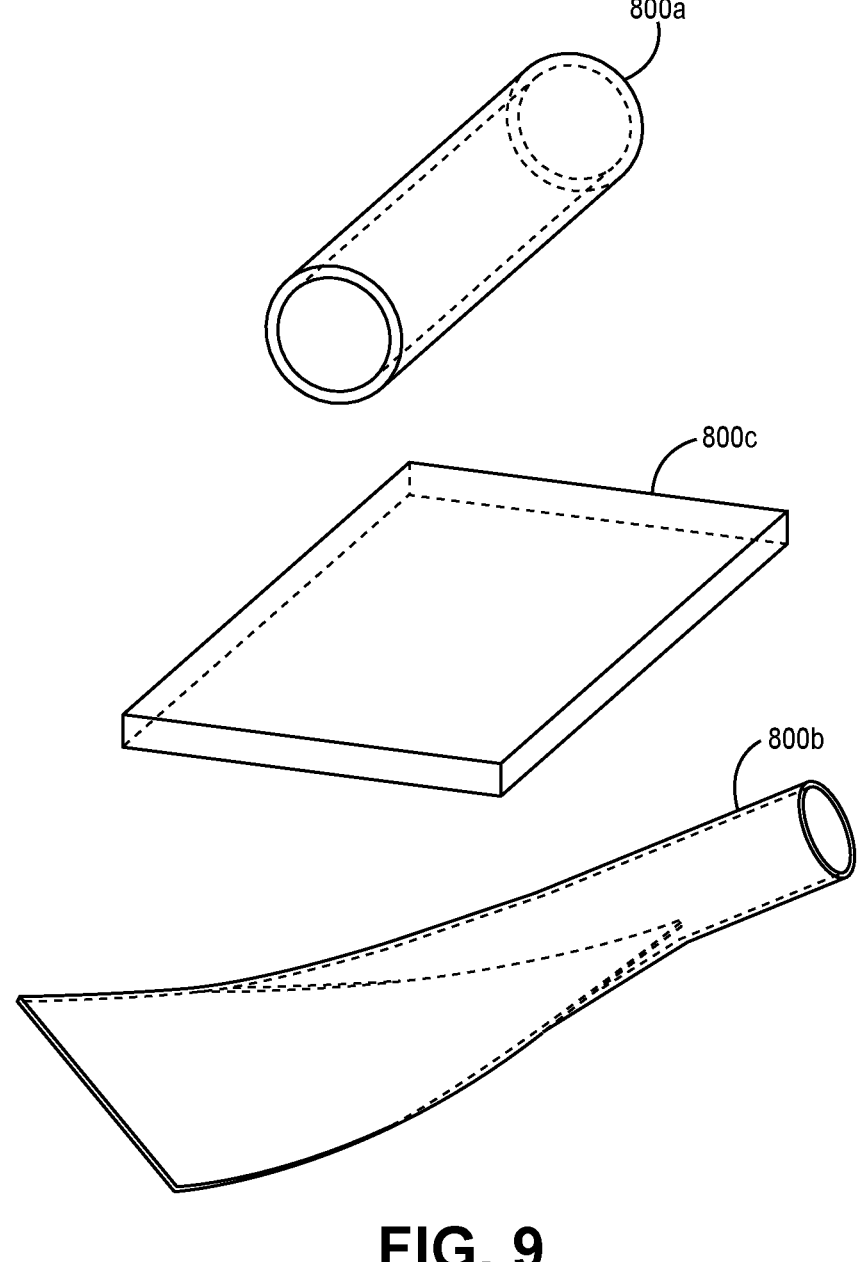
FIG. 9 is a schematic drawing showing perspective views of the foamed starch at various stages according to the methods described herein.

FIG. 9 is a schematic drawing showing perspective views of the foamed starch at various stages according to the methods described herein. The foamed starch exits the annular extrusion die in the form of foamed tube 800*a*. The tube is then fed into the eductor and slit longitudinally by a blade and flattened radially to give partially slit foamed tube 800*b*. A flattened or semi-flattened portion of the foamed tube exits an apparatus such as 900, which can then be cut widthwise to provide foamed starch sheet 800*c*.

The embodiments above are intended to be illustrative and not limiting. Additional embodiments are within the claims and inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A packaging material comprising
   a plurality of sheets of expanded starch and a cellulosic web laminated directly between two of the sheets, with starch presenting surfaces on the outside of the packaging material, wherein the cellulosic web has a thickness of no more than about 2 mm.

2. The packaging material of claim 1 wherein the cellulosic web comprises paper towel material.

3. The packaging material of claim 1 wherein the expanded starch has a density of no more than about 5 lbs/ft³.

4. The packaging material of claim 1 wherein each of the sheets of expanded starch comprises at least about 50 wt % starch.

5. The packaging material of claim 1 wherein the sheets of expanded starch are fluted.

6. The packaging material of claim 1 wherein the packaging material comprises a stack of a plurality of alternating cellulosic webs between sheets of expanded starch.

7. The packaging material of claim 1 wherein each of the sheets of expanded starch comprises at least about 50 wt % starch and from about 2 wt % to about 30 wt % polyvinyl alcohol or copolymers thereof.

8. The packaging material of claim 1 wherein each of the sheets of expanded starch further comprises up to about 10 wt % of an elastomeric or lower melting thermoplastic polymer.

9. The packaging material of claim 1 wherein the sheets of expanded starch include fluted and nonfluted sheets.

10. The packaging material of claim 1 wherein the packaging material is biodegradable.

11. The packaging material of claim 1 wherein the expanded starch is formed from melted starch.

12. The packaging material of claim 1 wherein the sheets of expanded starch are formed by extrusion.

13. The packaging material of claim 1 wherein the expanded starch has a density of no more than about 10 lbs/ft³.

14. The packaging material of claim 1 wherein the cellulosic web has a thickness no more than about 0.8 mm.

15. The packaging material of claim 1 wherein each of the sheets of expanded starch has a thickness from about ¼ inch to about 6 inches.

16. The packaging material of claim 15 wherein each of the sheets of expanded starch has a width of up to about 6 feet.

17. The packaging material of claim 2 wherein the paper towel material is embossed.

18. A packaging material comprising
   a plurality of sheets of expanded starch and a cellulosic web laminated directly between two of the sheets, with starch presenting surfaces on the outside of the packaging material, wherein the cellulosic web has a thickness of no more than about 2 mm wherein the cellulosic web comprises from about 60 wt % to about 100 wt % of cellulose fibers.

19. The packaging material of claim 18 wherein each of the sheets of expanded starch has a thickness from about ¼ inch to about 6 inches.

20. A packaging material comprising
   a plurality of sheets of expanded starch and a cellulosic web laminated directly between two of the sheets, wherein the plurality of sheets of expanded starch comprise fluted sheets.

21. The packaging material of claim 20 wherein outer surfaces of the packaging material comprise starch presenting surfaces.

22. The packaging material of claim 20 wherein the plurality of sheets of expanded starch comprise fluted and nonfluted sheets.

23. The packaging material of claim 20 wherein each sheet of the plurality of sheets of expanded starch has a thickness from about ¼ inch to about 6 inches.

24. The packaging material of claim 20 comprising a plurality of cellulosic webs, and the plurality of sheets of expanded starch and the plurality of cellulosic webs comprise a stack of alternating cellulosic webs between sheets of expanded starch.

* * * * *